S. G. RYDER.
GAGE.
APPLICATION FILED OCT. 27, 1908.
926,079.
Patented June 22, 1909.
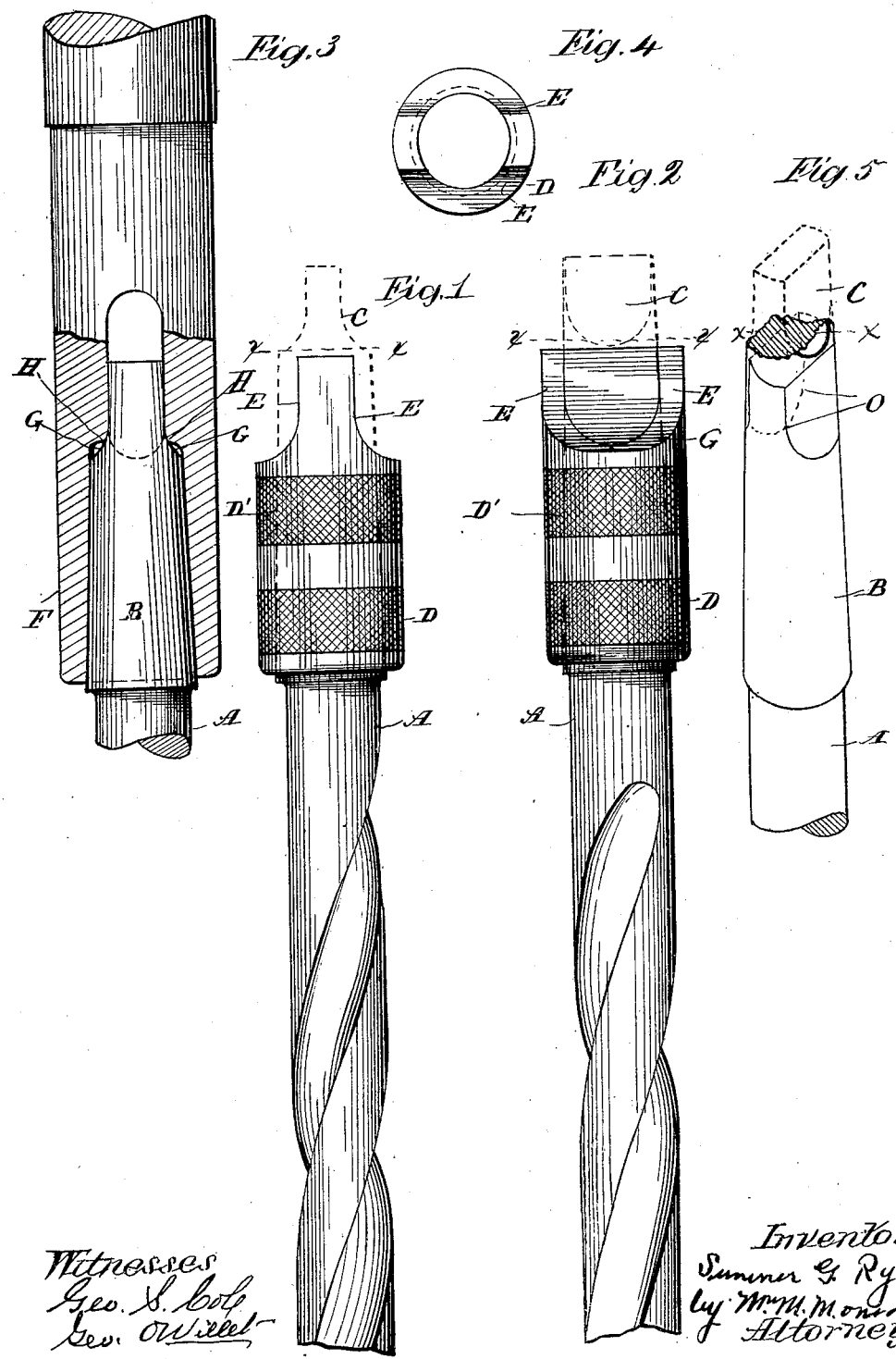

UNITED STATES PATENT OFFICE.

SUMNER G. RYDER, OF CLEVELAND, OHIO, ASSIGNOR TO THE STANDARD TOOL COMPANY, OF CLEVELAND, OHIO, A CORPORATION OF OHIO.

GAGE.

No. 926,079.  Specification of Letters Patent.  Patented June 22, 1909.

Application filed October 27, 1908. Serial No. 459,742.

*To all whom it may concern:*

Be it known that I, SUMNER G. RYDER, a citizen of the United States, and resident of Cleveland, in the county of Cuyahoga and State of Ohio, have invented certain new and useful Improvements in Gages, of which I hereby declare the following to be a full, clear, and exact description, such as will enable others skilled in the art to which it appertains to make and use the same.

The objects of the invention are to provide a combined gage and pattern by means of which the stub end of a broken shank for a twist drill or other tool having a tapered shank, and adapted for use in a long tapered socket, may be marked for recutting or grinding, so that it can be used in a shorter socket, adapted for the purpose, and thereby a valuable tool can be again put into shape for use.

In tapered shank drills there is always found a tapered alining or centering portion and a flat driving portion. The flat driving portion being narrow and hence necessarily of less torsional strength than the tapered portion of the drill it can be broken; as when the drill stalls in the work, or when it is not carefully driven and the drill becomes worthless for use with the old socket without regrinding the entire taper end so that it can be inserted higher up in the socket. This requires great labor and care to properly aline the taper part and for this reason the drill is ordinarily thrown away when broken.

To provide a simple and more practical and efficient means for repairing the drill and one which will insure a perfect alinement thereof and provide a new driving extremity therefor I provide a tapered gage, or false socket, into which the broken end of the drill can be inserted, and the upper edges of this gage are cut away upon two sides so as to form a facsimile of the finished driving end where the face of the gage engages the broken shank. This face forms a guiding angle with the broken shank following which a steel point can be made to mark the required shape upon the shank, so that it is a simple matter to grind, file or mill the required shape in the broken shank. A shorter socket having a corresponding taper with that of the gage is then employed and the gage and short socket complete the means required.

The invention consists in the details of construction and combination and arrangement of parts as hereinafter described, shown in the accompanying drawings and specifically pointed out in the claims.

In the accompanying drawings, Figure 1 is an edge elevation of a drill, and superimposed gage, showing a repaired drill, and in dotted lines the original shape of the drill; Fig. 2 is a side elevation of the same; Fig. 3 is a central longitudinal section of the short socket showing the repaired drill shank therein; Fig. 4 is a plan view from above of the gage; Fig. 5 is a perspective view of the broken shank showing the outline of the repaired shank thereon, and the original shape in dotted lines.

In these views A is the drill provided with tapered shank B and flattened driving portion C. D is the gage which comprises a false socket or internally tapered sleeve, the taper D' of which is slightly larger in diameter than that of the broken portion of the shank, so that it will fit closely thereon below the break, which may be said to have taken place above the line $x$—$x$— Figs. 1 and 2. The upper portion of the gage is cut away on two sides at E, E, thus forming surfaces at an angle to the surface of the shank in which may be traced the exact shape of a new driving head for the shank. This tracing or outline O if made with a steel point will remain on the shank as seen in Fig. 5 and serve as a gage by means of which to regrind the shank, so that it will fit in a short socket having a corresponding taper, and the drill can be used again. This socket is shown at F and without it the repaired shank could not be used. After grinding the shank can be placed in the gage sleeve again and tested for perfect shape as in Figs. 1 and 2 and this action may be repeated until the adjacent parts exactly coincide.

The shoulders G, G of the shank are so located in the gage as to exactly correspond with the shoulders H, H, in the socket and their respective tapers also correspond so that a perfect fit can be obtained without loss of time. Without the gage this would be practically impossible to accomplish, since the location of the shoulders and the taper of the parts could only be ascertained with great difficulty.

It is obvious that the socket in which the tool is finally used must be considerably shortened, and the tapered portion larger in diameter than the upper end of the original socket. It thus forms in connection with the gage an indispensable means for utilizing a broken shank to accomplish good work.

Having described the invention what I claim as new and desire to secure by Letters Patent is:—

1. A gage adapted to locate the outline of a fresh driving head upon a broken taper shank, comprising a sleeve provided with an internally tapered opening of the same size as the lower portion of said taper shank, and through which said broken portion is adapted to project, said sleeve being cut away on two sides at the upper end to form the outline for a fresh driving head.

2. A gage adapted to fix the shape of a new driving head upon a taper shank, the driving head of which has been broken off, comprising a sleeve provided with a taper opening adapted to fit the taper of the said shank, at the required position, said sleeve being cut away at its upper end on opposite sides to form surfaces adapted to locate the outline of the sides and shoulders of said new driving head upon said shank.

3. A gage for the purpose set forth, having a sleeve provided with a tapered longitudinal opening, and having its upper end cut away on opposite side to form parallel sides and outwardly curved shoulders.

4. A gage adapted to fix the outline of a new driving head upon a taper shank, from which the driving head has been broken consisting of, a sleeve provided with a central tapered longitudinal opening and cut away on two sides at the end having the smallest opening to form flat sides and outwardly curved shoulders therein.

In testimony whereof I hereunto set my hand this 12 day of September 1908.

SUMNER G. RYDER.

In presence of—
 E. E. NORTHWAY,
 WM. M. MONROE.